United States Patent
Rajadurai

(10) Patent No.: US 11,716,618 B2
(45) Date of Patent: Aug. 1, 2023

(54) METHOD AND APPARATUS FOR AUTHENTICATION OF INTEGRATED ACCESS AND BACKHAUL (IAB) NODE IN WIRELESS NETWORK

(71) Applicant: Samsung Electronics Co., Ltd., Suwon-si (KR)

(72) Inventor: Rajavelsamy Rajadurai, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 247 days.

(21) Appl. No.: 17/003,776

(22) Filed: Aug. 26, 2020

(65) Prior Publication Data

US 2021/0105622 A1 Apr. 8, 2021

(30) Foreign Application Priority Data

Aug. 26, 2019 (IN) .............................. 201941034390
Aug. 14, 2020 (IN) .............................. 201941034390

(51) Int. Cl.
| | |
|---|---|
| H04W 12/06 | (2021.01) |
| H04L 9/40 | (2022.01) |
| H04W 8/08 | (2009.01) |
| H04W 8/26 | (2009.01) |
| H04W 48/16 | (2009.01) |
| H04W 88/14 | (2009.01) |

(52) U.S. Cl.
CPC .......... *H04W 12/06* (2013.01); *H04L 63/164* (2013.01); *H04W 8/08* (2013.01); *H04W 8/26* (2013.01); *H04W 48/16* (2013.01); *H04W 88/14* (2013.01)

(58) Field of Classification Search
CPC ......... H04W 12/06; H04W 8/08; H04W 8/26; H04W 48/16; H04W 88/14; H04L 63/164
USPC .................................................... 709/4; 726/4
See application file for complete search history.

(56) References Cited

U.S. PATENT DOCUMENTS

| | | | |
|---|---|---|---|
| 8,406,192 B2 * | 3/2013 | Cai ................... | H04W 36/0033 370/315 |
| 8,909,787 B2 | 12/2014 | Dai et al. | |

(Continued)

OTHER PUBLICATIONS

Samsung, "(TP for NR_IAB BL CR for TS38.401) Discussion on IAB node integration procedure", 3GPP TSG-RAN WG3 Meeting #105, Aug. 26-30, 2019, R3-193970, 5 pages.

(Continued)

*Primary Examiner* — Hermon Asres

(57) ABSTRACT

Accordingly, the embodiments herein provide a method for authentication of an IAB node by an IAB-donor node in a wireless network. The method includes obtaining an IAB authorization information of the IAB node from one of an Access and Mobility Management Function (AMF) and a Mobility Management Entity (MME) of the wireless network, determining whether the IAB authorization information of the IAB node indicates the IAB node is authorized, and allocating a unique identity/parameter to the IAB node during an IAB-Mobile Termination (MT) setup and/or Backhaul Radio Link Control (RLC) channel establishment and/or Routing update phase. Further, the method includes storing the unique identity/parameter in a user equipment (UE)-context, which is used to identify the UE-context during an IAB-Distributed Unit (DU) part setup for authorization check and/or authentication.

14 Claims, 11 Drawing Sheets

(56) References Cited

U.S. PATENT DOCUMENTS

2018/0097785 A1\* 4/2018 Yang .................... H04L 63/062
2020/0120725 A1\* 4/2020 Mildh ................... H04W 76/12

OTHER PUBLICATIONS

Thales et al., "IAB-node: terminology change", 3GPP TSG-SA WG3 Meeting #96, Aug. 26-30, 2019, S3-192665, 6 pages.
ZTE Corporation et al., "Discussion on IAB node connection setup", 3GPP TSG-RAN WG2#107, Aug. 26-30, 2019, R2-1909629, 3 pages.
Notification of Transmittal of the International Search Report and the Written Opinion of the International Searching Authority, or the Declaration dated Dec. 3, 2020 in connection with International Patent Application No. PCT/KR2020/011415, 8 pages.
"3rd Generation Partnership Project; Technical Specification Group Services and System Aspects; Study on Security for NR Integrated Access and Backhaul; (Release 16)", 3GPP TR 33.824 V0.3.0 (Jun. 2019), 21 pages.
Samsung, "Establishment of F1 security association using Shared Key", 3GPP TSG-SA WG3 Meeting #95Bis, Jun. 24-28, 2019, S3-192202, 3 pages.
Huawei, "Integration of IAB Node", 3GPP TSG-RAN WG3 Meeting #104, May 13-17, 2019, R3-192803, 7 pages.
Samsung, "Solution for authorization of IAB Node", 3GPP TSG-SA WG3 Meeting #96, Aug. 26-30, 2019, S3-192912, 4 pages.
Supplementary European Search Report dated Sep. 15, 2022 in connection with European Patent Application No. 20 85 8914, 11 pages.

\* cited by examiner

METHOD AND APPARATUS FOR AUTHENTICATION OF INTEGRATED ACCESS AND BACKHAUL (IAB) NODE IN WIRELESS NETWORK

CROSS REFERENCE TO RELATED APPLICATIONS

This application is based on and claims the benefit of Indian Provisional Application No. 201941034390 filed on Aug. 26, 2019 and Complete Indian Patent Application No. 201941034390 filed on Aug. 14, 2020, the disclosures of which are herein incorporated by reference in their entirety.

BACKGROUND

1. Field

The present invention relates to a wireless communication system, and more specifically related to a method for authentication of an Integrated Access and Backhaul (IAB) node in a wireless network.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 giga-Hertz (GHz) bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as technologies connectivity network where humans generate and consume information, is now evolving to the Internet of things (IoT) where the cloud server has IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

SUMMARY

Accordingly, the embodiments herein provide a method for authentication of an Integrated Access and Backhaul (IAB) node in a wireless network. The method comprises obtaining, by an IAB-donor node, an IAB authorization information of the IAB node from one of an Access and Mobility Management Function (AMF) and a Mobility Management Entity (MME) of the wireless network, determining, by the IAB-donor node, that the IAB authorization information of the IAB node indicates the IAB node is authorized, allocating, by the IAB-donor node, at least one Internet Protocol (IP) address to a Distributed Unit (DU) of the IAB node in response to a receive request from the IAB node, storing, by the IAB-donor node, the allocated at least one IP address of the DU of the IAB node in a context information of the IAB node, receiving, by the IAB-donor node, an F1 setup message along with the allocated at least one IP address from the IAB node to initiate an F1 connection between the IAB node and the IAB-donor node, and identifying, by the IAB-donor node, the context information of the IAB node using the allocated at least one IP address.

In an embodiment, the method further comprises: generating, by the IAB-donor node, security parameters using the identified context information to perform authentication of the IAB node, and establishing, by the IAB-donor node, an Internet Protocol Security (IPsec) connection with the IAB node after successful authentication based on the generated security parameters from the identified context information.

In an embodiment, the method comprises: performing, by the IAB node, an authentication with a core network and establishing an AS security context with the IAB-donor node, wherein the IAB node act as a user equipment (UE), wherein the core network comprises one of the AMF and the MME of the wireless network, authorizing, by the core network, the IAB node through a subscription profile of the IAB node during a registration procedure of IAB node, and sending, by the core network, the IAB authorization information to the IAB-donor node.

In an embodiment, the establishing the AS security context with the IAB-donor node includes using the context information provided by one of a normal gNodeB (gNB) or eNodeB (eNB), as part of one of an handover procedure, an initial attachment procedure, a secondary gNB (SgNB) addition procedure.

In an embodiment, the IAB-donor node obtains the IAB authorization information of the IAB node from one of the AMF and the MME during a part of an initial context setup procedure.

In an embodiment, the F1 connection is initiated by a DU functionality of the IAB node.

In an embodiment, the at least one IP address is allocated to the DU of the IAB node by at least one of an Operations, administration and management (OAM) server, a Central Unit (CU) of the IAB-donor node, and a DU of the IAB-donor node.

Accordingly, the embodiments herein provide an IAB donor node for authentication of an Integrated Access and Backhaul (IAB) node in a wireless network. The IAB donor node comprises: a memory, a processor coupled with the memory, and an authentication controller, coupled with the processor, configured to: obtain an IAB authorization information of the IAB node from one of an Access and Mobility Management Function (AMF) and a Mobility Management Entity (MIME) of the wireless network, determine that the IAB authorization information of the IAB node indicates the IAB node is authorized, allocate at least one Internet Protocol (IP) address to a Distributed Unit (DU) of the IAB node in response to determining that the IAB node is authorized, store the allocated at least one IP address of the DU of the IAB node in a context information of the IAB node, send the at least one IP address of the DU of the IAB node to the IAB node, receive an F1 setup message along with the allocated at least one IP address from the IAB node to initiate an F1 connection between the IAB node and the IAB-donor node, and identify the context information of the IAB node using the allocated at least one IP address.

In an embodiment, the IAB-donor node further comprises: generating, by the IAB-donor node, security parameters using the identified context information to perform authentication of the IAB node, and establishing, by the IAB-donor node, an Internet Protocol Security (IPsec) connection with the IAB node after successful authentication based on the generated security parameters from the identified context information.

In an embodiment, the IAB-donor node obtains the IAB authorization information of the IAB node from the AMF or MME during a part of an initial context setup procedure.

In an embodiment, the F1 connection is initiated by a DU functionality of the IAB node.

In an embodiment, the at least one IP address is allocated to the DU of the IAB node by at least one of an Operations, administration and management (OAM) server, a Central Unit (CU) of the IAB-donor node, and a DU of the IAB-donor node.

Accordingly, the embodiments herein provide a method for authentication of an Integrated Access and Backhaul (IAB) node in a wireless network. The method comprises: obtaining, by an IAB-donor node, an IAB authorization information of the IAB node from one of an Access and Mobility Management Function (AMF) and a Mobility Management Entity (MME) of the wireless network, determining, by the IAB-donor node, that the IAB authorization information of the IAB node indicates the IAB node is authorized, receiving, by the IAB-donor node, at least one Internet Protocol (IP) address from the IAB node, wherein the received at least one IP address from the IAB node is assigned by an Operations, administration and management (OAM) server, storing, by the IAB-donor node, the at least one IP address of the DU of the IAB node in a context information of the IAB node, receiving, by the IAB-donor node, an F1 setup message along with the allocated at least one IP address from the IAB node to initiate an F1 connection between the IAB node and the IAB-donor node, identifying, by the IAB-donor node, the context information of the IAB node using the allocated at least one IP address, generating, by the IAB-donor node, security parameters using the identified context information to perform authentication of the IAB node, and establishing, by the IAB-donor node, an Internet Protocol Security (IPsec) connection with the IAB node after successful authentication based on the generated security parameters from the identified context information.

Accordingly, the embodiments herein provide a method for authentication of an Integrated Access and Backhaul (IAB) node in a wireless network. The method comprises: receiving, by a IAB-donor node, an F1 setup message along with at least one Internet Protocol (IP) address from the IAB node to initiate an F1 connection between the IAB node and the IAB-donor node, identifying, by the IAB-donor node, a context information of the IAB node using the at least one IP address, generating, by the IAB-donor node, security parameters using the identified context information to perform authentication of the IAB node, and establishing, by the IAB-donor node, an Internet Protocol Security (IPsec) connection with the IAB node after successful authentication based on the generated security parameters from the identified context information.

In an embodiment, the identifying, by the IAB-donor node, the context information of the IAB node using the at least one IP address, comprises: obtaining, by the IAB-donor node, an IAB authorization information of the IAB node from one of an Access and Mobility Management Function (AMF) and a Mobility Management Entity (MME) of the wireless network, determining, by the IAB-donor node, that the IAB authorization information of the IAB node indicates the IAB node is authorized, allocating, by the IAB-donor node, the at least one IP address to a Distributed Unit (DU) of the IAB node in response to a receive request from the IAB node, and storing, by the IAB-donor node, the allocated at least one IP address of the DU of the IAB node in a context information of the IAB node.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
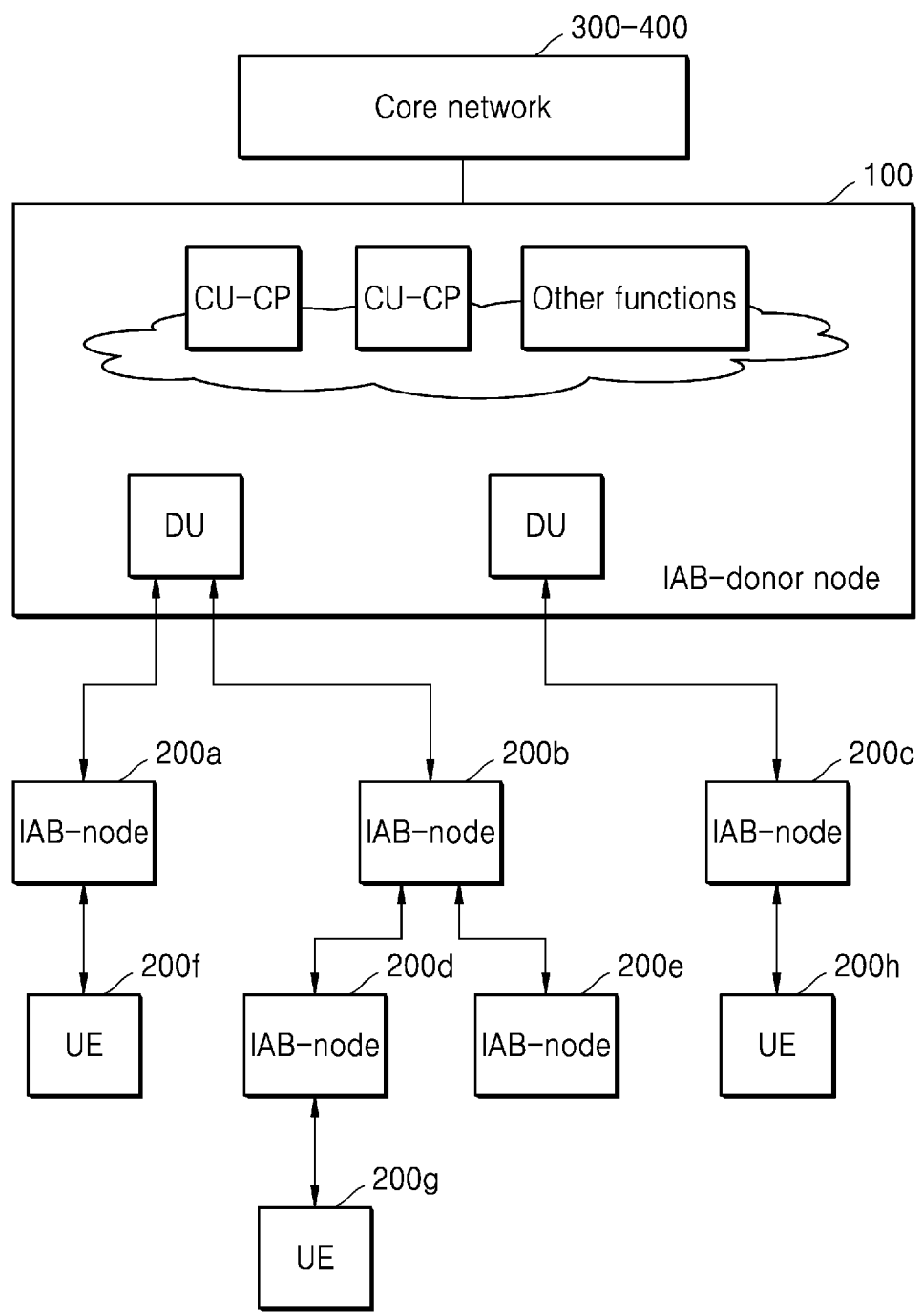
FIGS. 1A-1C illustrate an integrated access backhaul (IAB) architecture, according to some embodiments.

FIGS. 1A through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Throughout the disclosure, the terms "F1*" and "F1" are used interchangeably and mean the NR backhaul link (NR link used for backhauling (maybe wireless) between an IAB node to an IAB-donor, and between IAB nodes in case of a multi-hop network). Further F1* means F1*-C and/or F1*-U. The IAB authorized information indicates at least one of authorized, not authorized. The term "$K_{gNB}$" also means "S-$K_{gNB}$" or "$K_{SN}$", when considering a dual connectivity architecture and used interchangeably throughout this document. Further, the term "Base Station (300)" may also be an "IAB donor node", when the IAB-node connects to a 5GC or a gNB or an eNB. The term "IAB donor device" or "IAB-donor node" or "IAB-donor gNB" means the same and are used interchangeably throughout the document. Further the term "MT function", "IAB-node MT", "IAB-node UE", "IAB-MT", "IAB-UE" and "IAB-UE function" in an IAB node are the same and are used interchangeably throughout the document. The term "IP address" can be an "IP version 4 (IPv4)" or "IP version 6 (IPv6)" address. In addition, a network entity comprises AMF (Access and Mobility Management Function) and MME (Mobility Management Entity).

3rd Generation Partnership Project (3GPP) decided to support wireless backhaul/relays in New Radio (NR). To enable faster fifth generation (5G) network deployment scenarios, support for wireless backhaul and relay links is required, as wireless links enable flexible and dense deployment of NR cells without the need for densification of a transport network proportionately. The 3GPP preferred to follow a Central Unit (CU)/Distributed Unit (DU) architecture, in which an integrated access backhaul (IAB) node hosts DU functionalities and Mobile termination (MT) functionalities and would effectively look like the DU connected through a wireless interface to the controlling CU. As a consequence, the wireless interface between the IAB-node and an IAB donor node is F1* interface/F1 connection, similar to an F1 interface connecting the CU and the DU.

Further, the F1* interface will have to exchange packets over the wireless interface, as opposed to the conventional F1 interface, in which F1 packets are exchanged over the wired network (so often F1* is mentioned as F1 throughout this document, leaving out the medium of access (air/wire)). Exchanging packets over the wireless interface creates new potential security risks for IAB deployments.

Phase-1 and/or Phase-2 of IAB-node Integration procedure: an IAB node acting as a user equipment (UE) with MT functionalities, performs the authentication, authorization, and establish an access stratum (AS) security context with an IAB-donor node. During the above procedure (i.e. IAB-MT setup), the IAB-donor node obtains the IAB authorization information of the IAB node from an AMF/MME (for example, as part of Initial Context Setup procedure (i.e. INITIAL CONTEXT SETUP REQUEST message)) and stores the authorization information of the IAB node along with the IAB node's context (i.e. UE context). Then during the IAB-DU part setup, the IAB-donor node checks whether the IAB-MT part is authorized. If authorized, then the IAB-donor node proceeds further with the IAB-DU part setup (i.e. Phase-3).

Further, at least one of the following is used as a unique parameter to identify the established UE context (thereby identify the authorization information and authentication parameters) of the IAB node during the IAB-DU part setup: Cell Radio Network Temporary Identifier (C-RNTI) (assigned to the IAB-node acting as a UE with MT functionalities), an Internet Protocol (IP) address allocated to the IAB node (during the Backhaul Radio Link Control (RLC) channel establishment and/or Routing update phase), Globally Unique Temporary ID (GUTI) (assigned by the core network), AS identity (IAB node-DU ID (gNB-DU ID)), Resume ID, Inactive Radio Network Temporary Identifier (I-RNTI), like so. The unique identity/parameter allocated to the IAB Node during the IAB-MT setup and/or Backhaul RLC channel establishment and/or Routing update phase is stored in the UE context, which is used to identify the context for authorization check and/or authentication during IAB-DU part setup.

There is need of a unique parameter stored during Phase-1 and/or Phase-2 procedure, so that during the Phase-3 (IAB-DU part setup), the IAB Node context (UE context) is identified to perform authentication and/or to determine whether the IAB node is "authorized" or "not authorized". Thus, a system and method are required to identify the established UE context and to check whether the IAB node is authorized (for example, "IAB Authorized") and/or to generate the security credentials/parameters required to perform authentication procedure to establish the F1* interface. Further, an authentication mechanism (using dynamic Pre-shared Key (PSK)) over an Internet Key Exchange (IKEv2) to establish Internet Protocol Security (IPsec) tunnels requires identification of the AS security context established by the IAB-UE, to generate a dynamic PSK and use it to perform authentication to establish the IPsec Security Associations (SA) for the F1 interface. To identify the established IAB-node's context (UE context) by the IAB-donor, to perform authorization and/or authentication of the IAB-node, during the IAB-DU part setup, the IP address assigned during the phase-2 is used to identify the UE context and to establishment the security association for the F1 interface.

The unique identity/parameter allocated to the IAB-node during the IAB-MT setup and/or Backhaul RLC channel establishment and/or Routing update phase (IP address of the IAB-node DU) is used to identify the context for authorization check and/or authentication during IAB-DU part setup. In some designs, the 3GPP AS security context is identified using the MT specific identifier (for example, C-RNTI). The AS security context is never identified using other identifiers like GUTI or using DU specific identifiers (like, DU IP address). The AS security context is identified by the gNB/(M)eNB/IAB-donor for establishment of Packet Data Convergence Protocol (PDCP) instances for protecting the signaling radio bearers (SRBs) and data radio bearers (DRBs).

Further, if IPsec Security Gateways (SEG) (the F1 interface IPsec may be terminated at the SEG, before the IAB-donor CU) is used, then the DU specific parameters (like Backhaul Adaptation Protocol (BAP) address) are not understandable by the SEG to handle the IAB/DU specific parameters and to request the IAB-donor CU for security context retrieval to establish the IPsec. So comparatively, using the IAB-node DU IP address to identify the 3GPP AS security context for DU setup security procedures (authentication and/or authorization) will be efficient. Further, an authentication mechanism over the IKEv2 to establish IPsec tunnels is performed for protection of F1 traffic at IP layer, using the IP address of the DU a IP layer parameter to identify the security context is more justified rather using other parameters like BAP address. As BAP address is not authenticated identifier (verification of the BAP address authenticity is not performed), which means a malicious IAB-node with valid BAP address can establish IPsec SAs for fake IP addresses leads to re-direction of victims packets to malicious IAB-node.

Figure 1B:
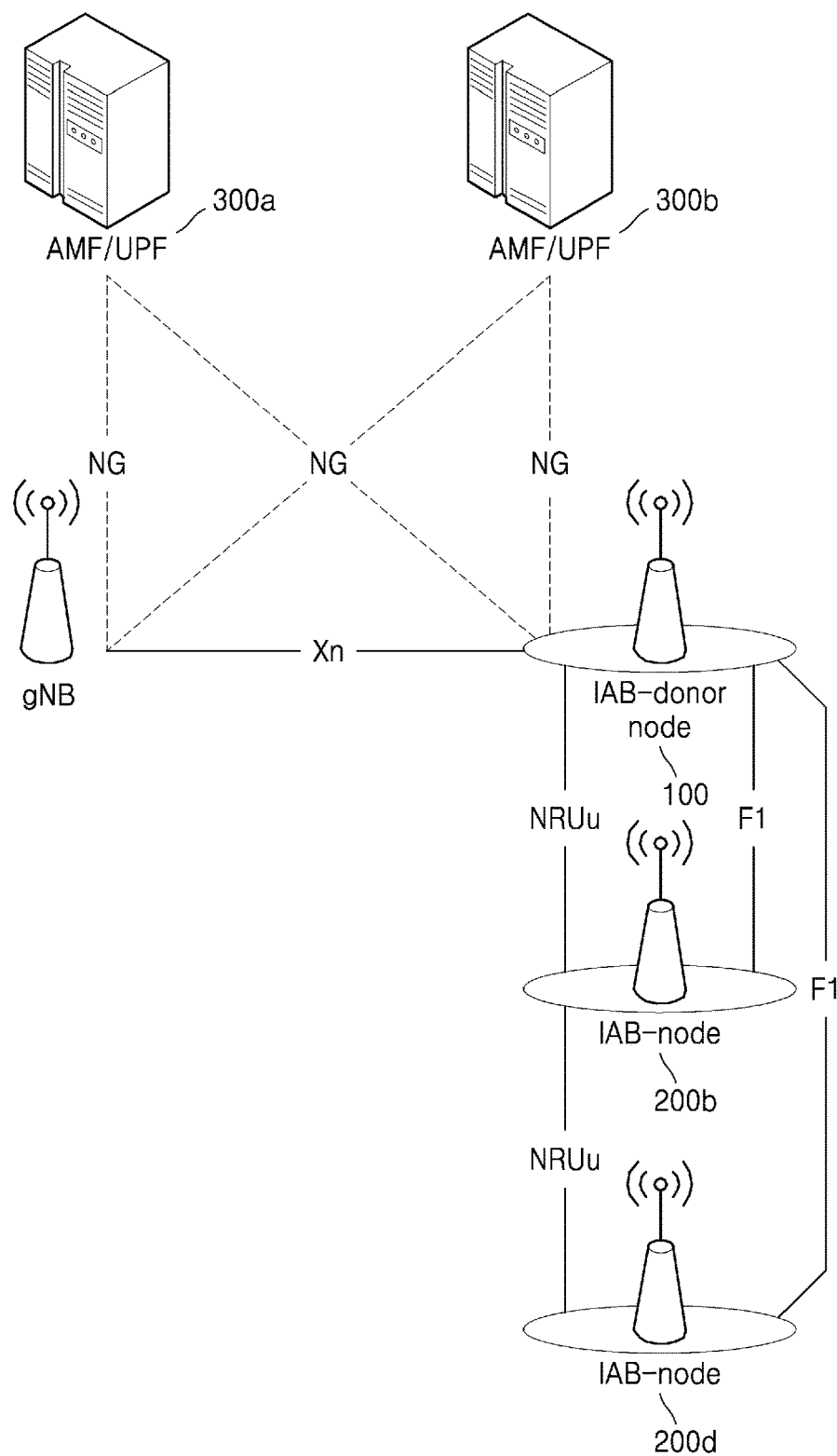
Figure 1C:
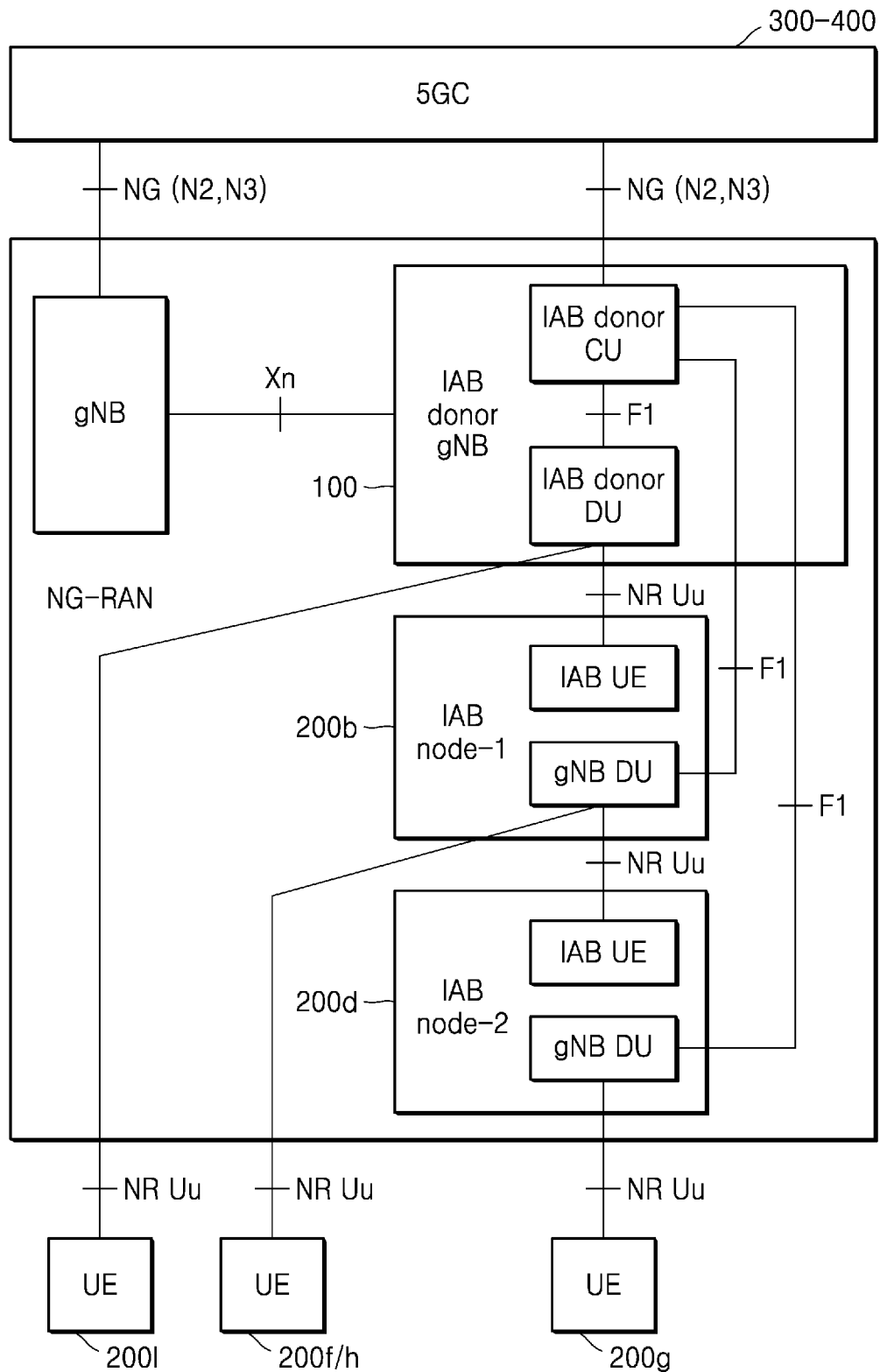

FIGS. 1A-1C illustrate an IAB architecture, according to some embodiments. Thus, the 3GPP decided to study the security aspects of the IAB architecture and protection of associated wireless backhaul links.

An IAB-donor node (100) is a gNodeB (gNB) that provides functionality to support an NR backhaul for IAB-nodes (200a-200e). In other words, IAB-donor node (100) is a gNB that provides network access to UEs via a network of backhaul and access links. The IAB-node (e.g. 100, 200a-200e) is a Radio Access Network (RAN) node that provides functionality to support connectivity to the network (300-

400) for a user equipment (UE) (200f-200h) via the NR backhaul. In other words, RAN node that supports NR access links to UEs and NR backhaul links to parent nodes and child nodes. The NR backhaul link is an NR link used for backhauling between the IAB node (200a-200e) to the IAB-donor node (100), and between the IAB nodes (200a-200e) in case of a multi-hop network.

The IAB-node (200a-200b) terminates a gNB-DU part of a F1-C and F1-U interfaces. The IAB-node's gNB-DU function, together with the gNB-CU on the IAB-donor node (100), provide NR access to UEs (200f-200h) and child IAB-nodes (200a-200e) in a southbound direction. The IAB-node also terminates a subset of an NR-Uu radio interface (i.e. mobile terminology (MT) part) to access the network in a northbound direction. The IAB-node (200a-200e) can access the network using either an NR standalone (SA)-mode or an NR non-standalone (NSA)-mode (i.e. EN-DC). In the NSA-mode, the IAB-node also connects via Long-Term Evolution (LTE) to a MeNB (i.e. MeNB to indicate that the MeNB is the 'Master' (M) base station controlling the 'Secondary' (S) 5G NR base station), and the IAB-donor node (100) terminates X2-C as SgNB, as shown in FIGS. 1B-1C.

The IAB-node (200a-200e) terminates an IP transport and is reachable from an operator's transport network via the DU part of the IAB-donor node (100). The IAB node (200a-200e) and the CU (i.e. CU-CP and CU-UP) of the donor gNB communicate with each other using IP as for CU/DU transport connections on wire line networks. In the downlink, the IAB-donor-DU performs mapping of IP packets destined for the IAB node (200a-200e) to southbound NR backhaul RLC-channels, while in the uplink the IAB node (200a-200e) performs mapping of IP packets destined for the operator transport network to northbound RLC-channels. The IAB Adaptation Layer (IAL) protocol, which resides above a Radio link control (RLC) layer, is used at the IAB nodes (200a-200e) and the DU part of the IAB donor node (100) to support forwarding across the IAB network. In the case of multi-hop deployments, the forwarding of packets in the intermediate IAB nodes (200a-200e) is done based on information carried in the IAL protocol and configuration received from the gNB-CU functionality of the donor gNB that sets up the mapping/forwarding rules/tables. On the wireless backhaul interface, the CU-CP of the IAB-donor node (100) will establish one or more backhaul (BH) RLC channels.

Referring to FIG. 1C, the part of the IAB node (200a-200e) that supports a Uu interface towards the IAB-donor node (100) or another parent IAB node is referred to as an IAB-UE (or IAB-MT). The backhaul connectivity of the IAB node (200b and 200d) or the IAB-donor node (100) or another parent IAB node (e.g. 200b is parent IAB node for 200d IAB node) with a Public Land Mobile Network (PLMN) is managed through the Uu interface. The DU (or gNB-DU) functionality in the IAB node (e.g. 100, 200b and 200d) is responsible for providing a NR Uu access to UEs (200f-200l) and child IAB-nodes (e.g. 200d). The corresponding gNB-CU functionality resides on the IAB-donor gNB, which controls IAB-node gNB-DU via the F1 interface. The IAB node (100, 200b and 200d) appears as a normal gNB to the UEs (200f-200l) and the other IAB-nodes and allows them to connect to the 5GC. A DU functionality of the IAB node (100, 200b and 200d) allows the UEs (200f-200l) to connect to the IAB node. The DU functionality of the IAB node (200b) together with the CU functionality on the IAB-donor node (100) provides an access to the core network to a child IAB node (200d) and the UEs (200c-200e) in a southbound direction. The IAB node (200a-200e) connects to the IAB-donor node (100) or parent IAB nodes using the MT functionality through a NR Uu interface. The IAB node receives data from the core network using the DU functionality of the IAB nodes (200a-200b) through the NR backhaul link. The Uu backhaul links can exist between the IAB node (200a-200b) and a gNB referred to as IAB-donor node (100) or another IAB node (200a-200b).

Figure 2:
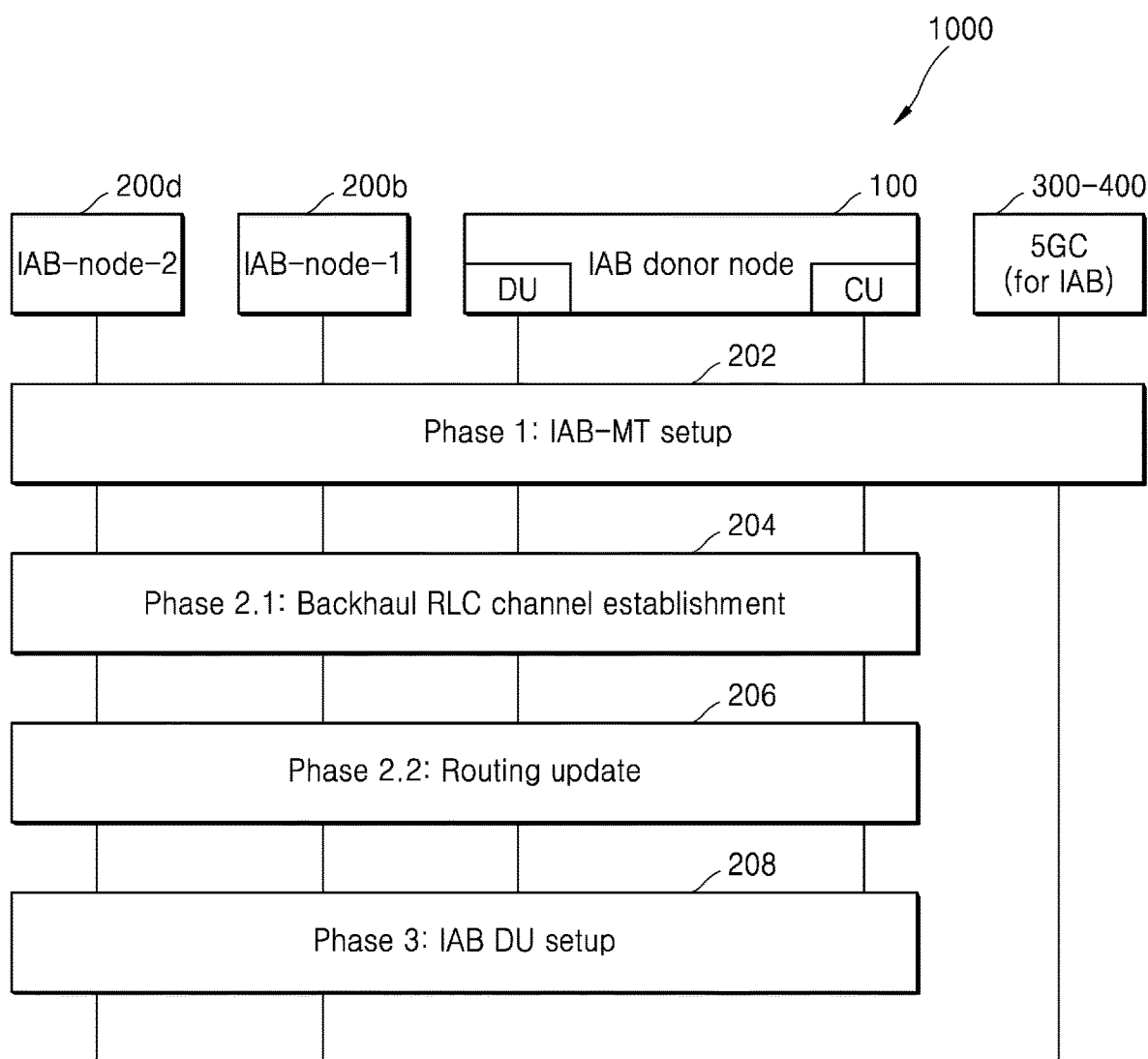
FIG. 2 illustrates a high-level flow of standalone (SA)-based IAB integration, according to some embodiments.

FIG. 2 illustrates a high-level flow of an SA-based IAB integration, according to some embodiments. The SA-based IAB integration includes an IAB-donor node (100), an IAB-node-1 (200b), an IAB-node-2 (200d), and a 5G core (5GC) (300-400) (e.g. network, core network) in a wireless network (1000).

At 202, Phase-1: an IAB-MT setup procedure where an MT functionality of the new IAB-node (e.g. the IAB-node-2) (200d) connects to the network as a normal UE, by performing a Radio Resource Control (RRC) connection setup procedure with an IAB-donor-CU, authentication with the core network (300-400), the IAB-node-2 (200d) related context management, IAB-node-2 (200d) access traffic-related radio bearer configuration at a Radio Access Network (RAN) side and optionally, Operations, administration and management (OAM) connectivity establishment. As part of the IAB-MT setup procedure, the IAB-MT node obtains the following parameters:

a) C-RNTI, assigned as part of RRC connection establishment procedure, provided over the RRC signaling message by the IAB-donor-CU/eNB and the C-RNTI is actually assigned by the IAB-donor DU/eNB for the IAB-node. C-RNTI is a unique identification used for identifying RRC Connection between the UE and the gNB/eNB and also used for scheduling, which is dedicated to a particular UE.

b) GUTI, is a core network temporary identifier, assigned as part of Registration procedure by the MME/AMF and provided over the NAS signaling message to the IAB-node by the MME/AMF (via, IAB-donor/eNB). GUTI is used between the UE and the MME/AMF for identification of the UE at the NAS layer.

c) Protocol Data Unit (PDU) session IP address/Packet Data Network (PDN) connection IP address, if the UE establish a user plane connection, for example with OAM server. SMF is responsible for session management and allocates IP addresses to UEs during PDU session establishment procedure and MME for PDN connection. IP address of UE's PDU/PDN session are maintained regardless of the location of the UE, such that the session continuity is maintained. PDU session IP address are used between the UE and the external network via the User Plane functions/gateways for IP layer routing. gNB/eNB use the PDU session IP address as a QoS filter parameter to enforce the QoS of the PDU session. PDU session IP address is never used as the UE identification parameter in the Radio Access Network (RAN) and there is no dependency between the PDU session IP address of the IAB-UE (specific to Data Network (DN)) and the IP address of the IAB-DU (specific to RAN), they are complete independent and assigned by different entities based on the network configuration.

At 204, Phase-2.1: a Backhaul RLC channel establishment where at least the backhaul RLC channels for CP traffic e.g. carrying F1-C messages to and from the IAB-node (e.g. IAB-node-1 (200b), IAB-node-2 (200d)), is established.

At 206, Phase-2.2: a routing update procedure where a Backhaul Adaptation Protocol (BAP) layer is updated to support routing between the new IAB-node-2 (200d) and the IAB-donor-DU. This includes configuration of a BAP routing identifier for routing in a downstream direction on the IAB-donor-DU and the BAP route identifier in an upstream direction on MT functionality of the IAB-node-2 (200*d*). The routing tables are updated for all ancestor IAB-nodes (e.g. IAB-node 1 (200*b*)) and the IAB-donor-DU with routing entries for a new BAP routing identifier. The DU functionality of the new IAB-node-2 (200*d*) configures an IP address to establish IP connectivity to the operator's network. As part of the Backhaul RLC channel establishment procedure and routing update procedure, the IAB-node via RRC signaling obtains the following IAB-DU specific parameters (UE is not aware of such parameter in normal operation):

a) BAP address and BAP routing ID for the IAB-DU.

b) At least one IP address allocation for the IAB-DU F1 interface, by the IAB-donor or by the OAM server.

At 208, Phase-3: an IAB-DU setup procedure where the DU functionality of the IAB-node-2 is configured. The DU functionality of the IAB-node-2 (200*d*) initiates the set up an F1-C connection with the IAB-donor-CU. After the F1 is set up, the IAB node can now start serving to the UEs.

The IAB-UE needs to be authenticated by the 3GPP network and the IAB-node needs to authenticate the 3GPP network, as like a normal UE accessing the 3GPP core network as specified in the 3GPP technical specifications. Further, the network needs to authorize the IAB node to provide service. The unauthorized IAB node with valid subscription credentials may get access to obtain/provide IAB service. Therefore, authorization for connectivity of the IAB Node to the 5GC or an Evolved Packet System (EPS) shall be evaluated by the network. The authorization for connectivity of the IAB Node to the 5GC/EPS shall be evaluated by the network once the IAB Node is successfully identified and authenticated. However, there is a need for the network to authorize and/or authenticate the IAB node twice, as the below two procedure are independent procedures, a. During the establishment of the secure RRC connection with the network (IAB-MT setup), the MT functionality in the IAB node performs authentication with the network, obtain authorization from the network and establish the AS security context for the secure exchange of the RRC messages and user plane traffic. The UE context is identified using C-RNTI in the RRC layer; and b. During establishment of secure F1* interface (IAB-DU setup), it is required to perform an authentication mechanism over an IKEv2 to establish Internet Protocol Security (IPsec) tunnels. In some designs, based on the authentication method, policy and authentication data is identified, for example, Identifier in the ID payload in IKEv2 protocol. Further, the network should ensure only authorized IAB Node establish the F1 security context to secure F1* interface.

When establishing the secure RRC connection (the IAB-node acting as a UE with MT functionalities), authorization is executed during an IAB Node Registration procedure and the core network (e.g. Unified data management (UDM) via Access and Mobility Management Function (AMF) or Home Subscriber Server (HSS) via Mobility Management Entity (MME)) shall authorize the IAB Node through a subscription profile. But when establishing a secure F1* interface, it is required to perform an independent authentication mechanism over the IKEv2 to establish IPsec tunnels and there is no mechanism defined how the Donor gNB (Donor-CU) authorize and/or authenticate the IAB Node to establish the F1* setup procedure dynamically (without pre-configuration of credentials). Particularly, there is no mechanism defined on how to identify the established UE context (established during Phase-1), when performing Phase-3 procedure (particularly to generate security parameters dynamically to perform authorization and/or authentication to establish secure F1* interface).

In some designs, to support a flexible plug and play of IAB-node and IAB-donor without a pre-configuration of the PSK(s), dynamic PSK computation for IKEv2 PSK authentication is supported. When dynamic PSK is used, the IAB-node and the IAB-donor shall calculate the PSK ($K_{IAB}$) using $K_{gNB}$. The IAB-donor need to identify the AS security context ($K_{gNB}$) of the IAB-node (established by the MT function) to derive the $K_{IAB}$ (for establishment of secure F1 interface). Therefore, a mechanism to identify the AS security context of the IAB-node (established in Phase-1 via NR Uu interface) in the IAB-Donor is required, when performing F1 interface set-up (Phase-3).

Accordingly, the embodiments herein provide a method for authentication of an IAB node by an IAB-donor node in a wireless network. The method includes obtaining an IAB authorization information of the IAB node from an Access and Mobility Management Function (AMF) or a Mobility Management Entity (MME) of the wireless network, determining whether the IAB authorization information of the IAB node (200) indicates the IAB node as authorized, and allocating a unique identity/parameter to the IAB node during an IAB-MT setup and/or Backhaul RLC channel establishment and/or Routing update phase. Further, the method includes storing the unique identity/parameter in a UE context, which is used to identify the UE context during an IAB-DU part setup for authorization check and/or authentication (by generating the security parameters dynamically using the security parameters established during IAB-MT setup and/or Backhaul RLC channel establishment and/or Routing update phase).

Referring now to the drawings, and more particularly to FIGS. 3A through 8, where similar reference characters denote corresponding features consistently throughout the figures, there are shown preferred embodiments.

Figure 3A:
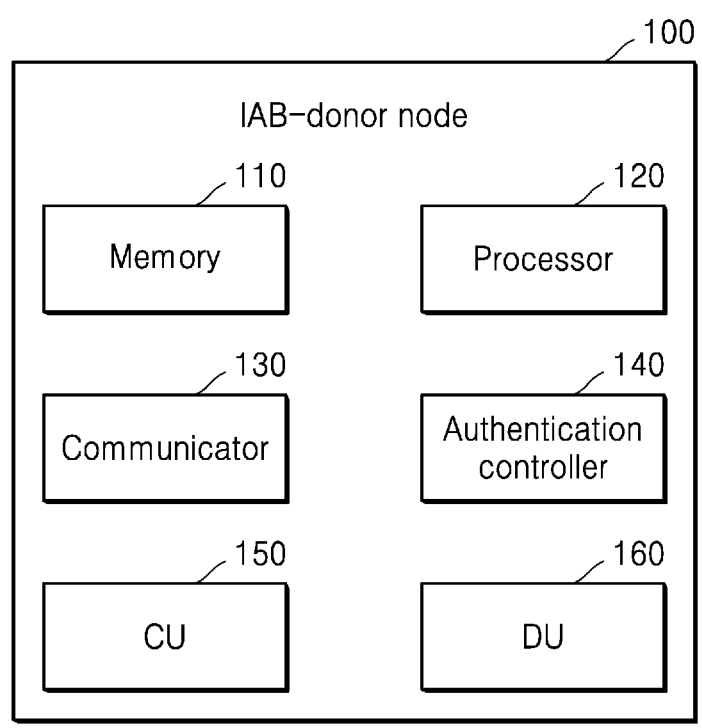
FIG. 3A illustrates a block diagram of an IAB-donor node for authentication of an IAB node in a wireless network, according to the embodiments as disclosed herein.

FIG. 3A illustrates a block diagram of an IAB-donor node (100) for authentication of an IAB node (200) (not shown in the FIG. 3A) in a wireless network (1000), according to the embodiments as disclosed herein. In an embodiment, the IAB-donor node (100) includes a memory (110), a processor (120), a communicator (130), an authentication controller (140), a Central Unit (CU) functionality (150) and a Distribution Unit (DU) functionality (160). Throughout this disclosure, the terms "CU functionality (150)", "IAB-donor-CU (150)" and "CU (150)" means the same and are used interchangeably. Throughout this disclosure, the terms "DU functionality (160)" and "DU (160)" are used interchangeably and means the same.

The memory (110) also stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) can be configured to store larger amounts of information than the memory. In certain examples, a non-transitory storage medium may store data that can, over time, change (e.g., in Random Access Memory (RAM) or cache). In an embodiment, the memory (110) can be an internal storage unit or the memory can be an external storage unit of the IAB-donor node (100), a cloud storage, or any other type of external storage.

The processor (120) communicates with the memory (110), the communicator (130), the authentication controller (140), the CU (150) and the DU (160). The processor (120) is configured to execute instructions stored in the memory (110) and to perform various processes. The communicator (130) is configured for communicating internally between internal hardware components and with external devices via one or more networks.

In an embodiment, the authentication controller (140) obtains an IAB authorization information of the IAB node (200) from an Access and Mobility Management Function (AMF) (300) or a Mobility Management Entity (MME) of the wireless network (1000). Further, the authentication controller (140) determines whether the IAB authorization information of the IAB node (200) indicates the IAB node (200) as authorized. Further, the authentication controller (140) allocates an Internet Protocol (IP) address to a Distributed Unit (DU) of the IAB node (200) in response to determining that the IAB authorization information of the IAB node (200) indicates the IAB node (200) as authorized, if requested by the IAB-node (200). Alternatively, the authentication controller (140) is informed by the IAB node (200), an Internet Protocol (IP) address of the Distributed Unit (DU) of the IAB node (200), if IP address is obtained by other means. Further, the authentication controller (140) is configured to store the allocated/informed IP address of the DU (250) of the IAB node (200) in a context of the IAB node (200) along with the IAB authorization information of the IAB node (200) in the memory (110).

Further, the authentication controller (140) sends the IP address of the DU (250) of the IAB node (200) to the IAB node (200), if requested by the IAB-node (200). Further, the authentication controller (140) receives an F1 setup message along with the allocated/informed IP address from the IAB node (200) to initiate an F1* connection between the IAB node (200) and the IAB-donor node (100). Further, the authentication controller (140) identifies the context of the IAB node using the allocated/informed IP address. Further, the authentication controller (140) may determines whether the stored IAB authorization information in the context of the IAB node (200) is authorized. Further, the authentication controller (140) establishes an Internet Protocol Security (IPsec) connection with the IAB node (200) in response to determining that the stored IAB authorization information in the context of the IAB node (200) is authorized and by generating security parameters from the identified context.

Although the FIG. 3A shows various hardware components of the IAB-donor node (100) it is to be understood that other embodiments are not limited thereon. In other embodiments, the IAB-donor node (100) may include less or more number of components. Further, the labels or names of the components are used only for illustrative purpose and does not limit the scope of the invention. One or more components can be combined together to perform same or substantially similar function to authenticate the IAB node (200) in the wireless network (1000).

Figure 3B:
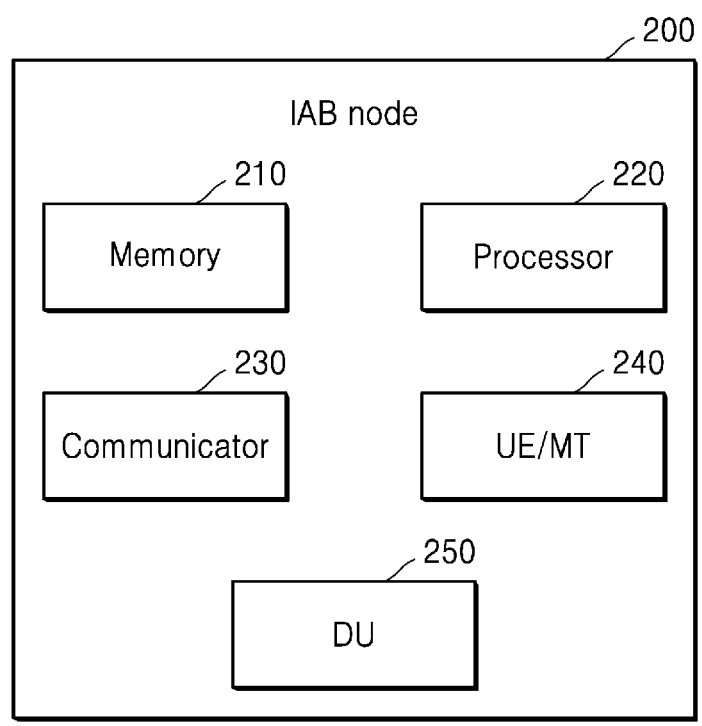
FIG. 3B illustrates a block diagram of the IAB node to establish/set-up an F1* interface with the IAB-donor node in the wireless network, according to the embodiments as disclosed herein.

FIG. 3B illustrates a block diagram of the IAB node (200) to establish/set-up the F1* interface with the IAB-donor node (100) in the wireless network (1000), according to the embodiments as disclosed herein. In an embodiment, the IAB node (200) includes a memory (210), a processor (220), a communicator (230), a Mobile Terminal (MT) functionality (240), and a DU functionality (250). Throughout this disclosure, the terms "MT functionality (240)", "IAB-MT (240)", "UE functionality (240)", "UE (240)" and "MT (240)" are used interchangeably and means the same. Throughout this disclosure, the terms "DU functionality (250)", "IAB-DU (250)" and "DU (250)" are used interchangeably.

The memory (210) also stores instructions to be executed by the processor (220). The memory (210) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (210) may, in some examples, be considered a non-transitory storage medium. The term "non-transitory" may indicate that the storage medium is not embodied in a carrier wave or a propagated signal. However, the term "non-transitory" should not be interpreted that the memory (210) is non-movable. In some examples, the memory (210) can be configured to store larger amounts of information than the memory. In certain examples, a non-transitory storage medium may store data that can, over time, change (e.g., in Random Access Memory (RAM) or cache). In an embodiment, the memory (210) can be an internal storage unit or the memory can be an external storage unit of the IAB-donor node (100), a cloud storage, or any other type of external storage.

The processor (220) communicates with the memory (210), the communicator (230), the UE (240) and the DU (250). The processor (220) is configured to execute instructions stored in the memory (210) and to perform various processes. The communicator (230) is configured for communicating internally between internal hardware components and with external devices via one or more networks.

In an embodiment, the UE (240) performs an authentication with a core network and establishing an AS security context with the IAB-donor node (100), the AS security context with the IAB-donor node (100) using a context provided by one of a normal gNodeB (gNB) or eNodeB (eNB), as part of a handover procedure, an initial attachment procedure, a secondary gNB (SgNB) addition procedure. Further, the DU (250) initiates the F1* connection with the IAB-donor node (100) by sending the F1 setup message.

Although the FIG. 3B shows various hardware components of the IAB node (200) but it is to be understood that other embodiments are not limited thereon. In other embodiments, the IAB node (200) may include less or more number of components. Further, the labels or names of the components are used only for illustrative purpose and does not limit the scope of the invention. One or more components can be combined together to perform same or substantially similar function to establish/set-up the F1* interface with the IAB-donor node (100) in the wireless network (1000).

Figure 4:
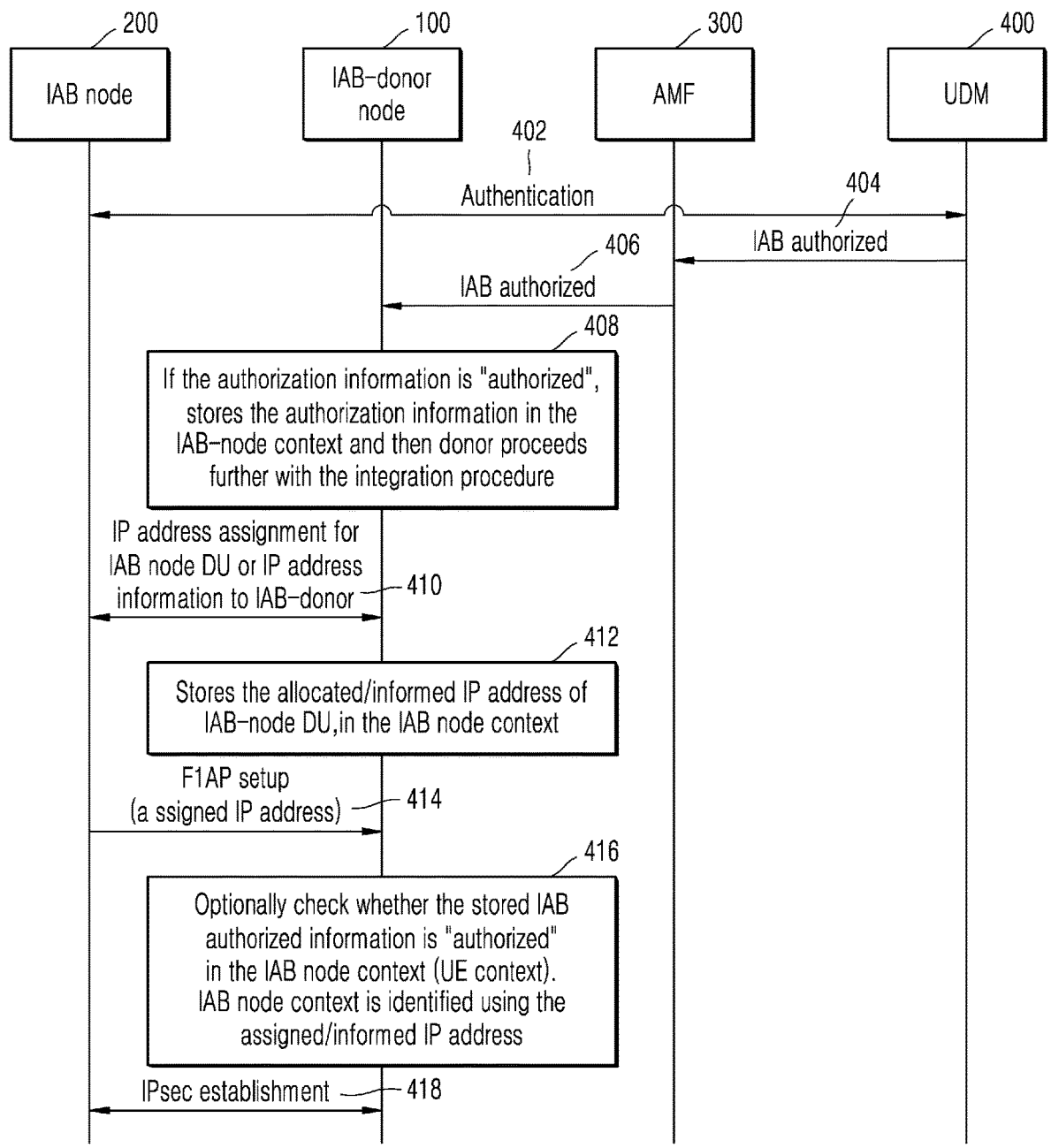
FIG. 4 illustrates a sequence diagram for determining a context of the IAB-node using an IAB-node DU IP address to establish/set-up the F1* interface with the IAB-donor node, according to the embodiments as disclosed herein.

FIG. 4 illustrates a sequence diagram for determining the context of the IAB node (200) using the IAB-node DU IP address to establish/set-up the F1* interface with the IAB-donor node (100), according to the embodiments as disclosed herein.

At 402, as part of the IAB-MT (240) setup procedure (Phase-1), the IAB node (200) (i.e. acting as the UE (240) with MT functionalities) performs the authentication and establish the AS security context with the normal gNB/eNB or with the IAB-donor (100). If registered with the normal gNB/eNB, then the IAB node (200) (i.e. acting as the UE (240) with MT functionalities) establishes the AS security context with the IAB-donor (100), either using the context provided by the normal gNB/eNB, as part of the handover procedure or by performing Attach/Registration (initial attach) procedure or by SgNB addition procedure (in this case normal gNB/eNB is MgNB/MeNB).

At 404-406, further as part of the IAB-MT (240) setup procedure (Phase-1), the authorization for connectivity of the IAB node (200) to the 5GC/EPS shall be evaluated by the network (e.g. AMF (300), UDM (400)) once the IAB node (200) is successfully identified and authenticated. The authorization is executed during the IAB node registration procedure. The core network shall authorize the IAB node (200) through the subscription profile. The IAB-donor (100) obtains the IAB authorization information of the IAB node (200) from the AMF (300)/MME (not shown in the FIG. 4) (for example, as part of initial context setup procedure (i.e. INITIAL CONTEXT SETUP REQUEST message)).

At 408, further as part of the IAB-MT (240) setup procedure (Phase-1), the IAB-donor (100) stores the authorization information of the IAB node (200) (i.e. received at 406) along with the IAB node's context (i.e. (NG-RAN node) UE context), if the authorization information is indicated as "authorized".

At 410, as part of the Phase-2 procedure, the at least one IP address of the DU (250) of the IAB node (200) can be assigned by the OAM server, or by the CU (150) of the IAB-donor node (100), or by the DU (160) of the IAB-donor node (100) during Phase-1 or during Phase-2. In other words, the IP address allocation procedure may occur at any time after RRC connection has been established. In case of IAB-donor-based IP address allocation, the at least one IP address is (are) allocated by the IAB-donor-CU (150) or IAB-donor-DU (160). In both cases, the IAB-node (200) requests the at least one IP address via RRC from the IAB-donor-CU (150). IAB-node (200) includes a separate IP address request for each usage, where the usages defined are all traffic, F1-U, F1-C and non-F1. The IAB-donor-CU (150) may initiate the IAB Transport Network Layer (TNL) Address Allocation procedure to obtain IP addresses from the IAB-donor-DU (160). The IAB-donor-CU (150) sends the IP addresses allocated for each usage to the IAB-node (200) via RRC.

In case of OAM-based IP address allocation, the IAB-node (200) informs the IAB-donor-CU (150) via an UL RRC message about the at least one IP address the IAB-node (200) received for each purpose and the IAB-donor-CU (150) stores the at least one IP address.

At 412, the IAB-donor (100) stores the assigned/informed at least one IP address of the DU (250) of the IAB node (200) in the context of the IAB node (200) (i.e. UE context). Further, the Backhaul RLC channel establishment and routing update procedures are performed.

At 414, as part of the Phase-3 procedure, IAB-DU (250) setup, the IAB node (200) (DU functionality of the IAB node) initiates the F1* connection (for example, F1*-C) with the CU (150) of the IAB-donor node (100), by sending the F1 setup message to the IAB-donor node (100). The IAB node (200) includes the assigned/informed IP address (for example, as part of (outer) IP header (source IP address of the IAB-DU (for F1-C usage)) of the request message) with the F1 setup message to the IAB-donor node (100) (i.e. IAB-donor-CU (150)).

At 416, further as part of the Phase-3 procedure, IAB-DU (250) setup, the IAB node context is identified using the assigned/informed IP Address (for F1-C usage) at the IAB-donor node (100) and the IAB-donor node (100) may check whether the stored IAB authorized information is "authorized" in the IAB node context (i.e. UE context).

At 418, further as part of the Phase-3 procedure, IAB-DU (250) setup, the IAB-donor node (100) proceed with the setup procedure. To support a flexible plug and play of IAB-node (200) and IAB-donor node (100) without a pre-configuration of the PSK(s), dynamic PSK computation for IKEv2 PSK authentication may also be supported, as specified in TS 33.501 v16.3.0 onwards. When dynamic PSK is used, the IAB-node (200) and the IAB-donor node (100) shall calculate the PSK ($K_{IAB}$) as specified in the TS 33.501 v16.3.0 onwards. The IAB-donor node (100) uniquely identify the IAB-node's security context ($K_{gNB}$) using the IAB-node DU IP address (assigned for F1-C usage). The IAB-donor node (100) shall use $K_{IAB}$ as PSK for IKEv2 procedure between IAB-node (200) and the IAB-donor node (100).

Figure 5:
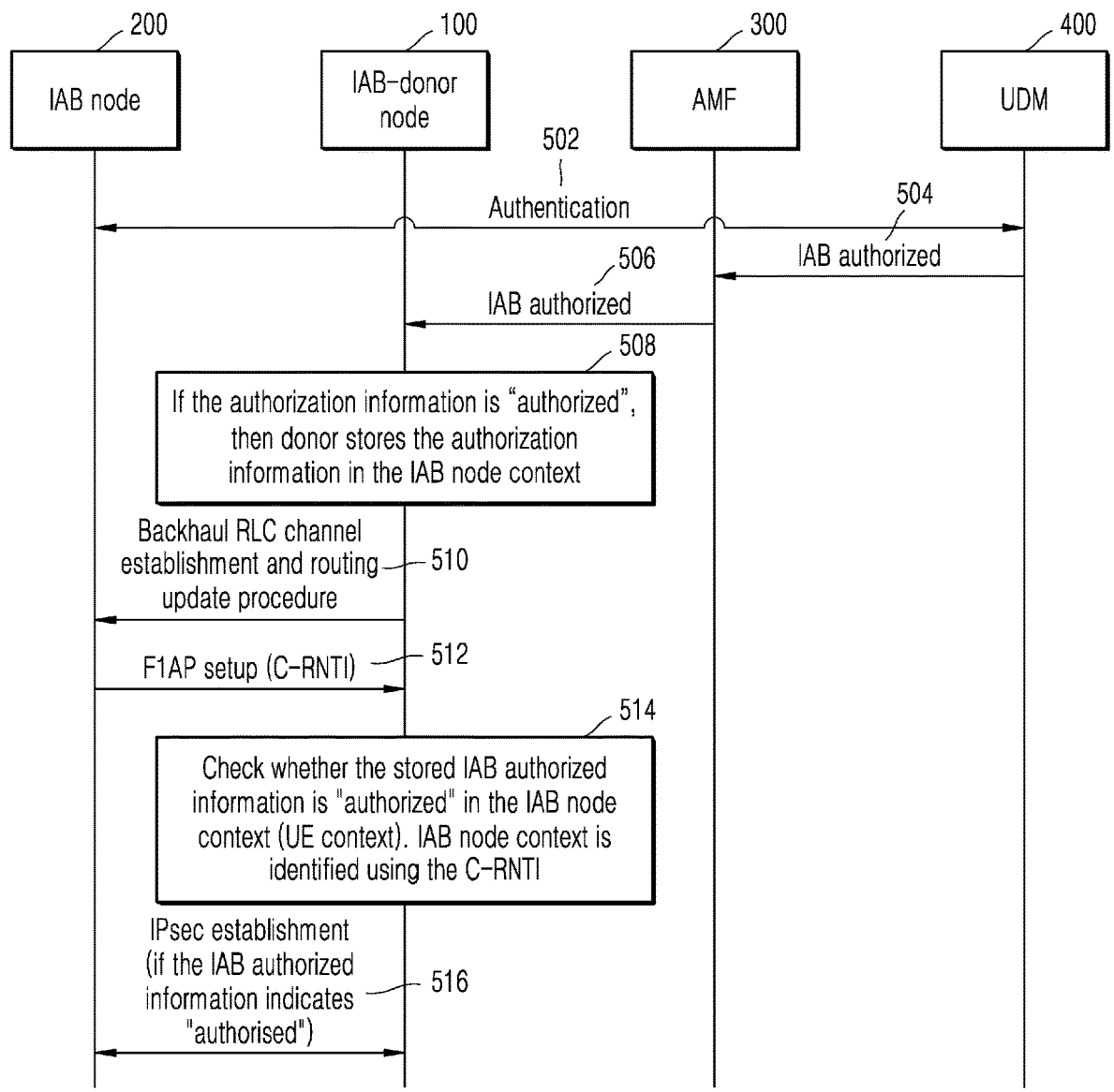
FIG. 5 illustrates a sequence diagram for determining the context of the IAB-node using a C-RNTI of the IAB-node MT functionality to establish/set-up the F1* interface with the IAB-donor node, according to the embodiments as disclosed herein.

FIG. 5 illustrates a sequence diagram for determining the context of the IAB node (200) using the C-RNTI of the IAB node MT functionality to establish/set-up the F1* interface with the IAB-donor node (100), according to the embodiments as disclosed herein.

At 502, as part of the IAB-MT (240) setup procedure (Phase 1), the IAB node (200) (i.e. acting as the UE (240) with MT functionalities) performs the authentication and establish the AS security context with the normal gNB or with the IAB-donor node (100). If registered with the normal gNB/eNB, then the IAB node (200) (i.e. acting as the UE (240) with MT functionalities) establishes the AS security context with the IAB-donor node (100), either using the context provided by the normal gNB/eNB, as part of the handover procedure or by performing Attach/Registration (initial attach) procedure or by SgNB addition procedure (in this case Normal gNB/eNB is MgNB/MeNB).

At 504-506, as part of the IAB-MT (240) setup procedure (Phase-1), the authorization for connectivity of the IAB node (200) to the 5GC/EPS shall be evaluated by the network once the IAB node (200) is successfully identified and authenticated. The authorization is executed during the IAB node registration procedure. The core network shall authorize the IAB node (200) through the subscription profile. The IAB-donor node (100) obtains the IAB authorization information of the IAB node (200) from the AMF (300)/MME (not shown in the FIG. 5) (for example, as part of Initial Context Setup procedure (i.e. INITIAL CONTEXT SETUP REQUEST message)).

At 508, as part of the IAB-MT (240) setup procedure (Phase-1), the IAB-donor node (100) stores the authorization information of the IAB node (200) (i.e. received at 506) along with the context of the IAB node (200) (i.e. UE context), if the authorization information is indicated as "authorized". Further, the IAB-donor node (100) may allocate or reserve IP address for IAB node (200)'s DU.

At 510, as part of the Phase-2 procedure, the Backhaul RLC channel establishment and routing update procedures are performed.

At 512, as part of the Phase-3 procedure, IAB-DU (250) setup, the IAB node (200) (i.e. DU functionality of the IAB node (200)) initiates the F1* connection (for example, F1*-C) with the CU (150) of the IAB-donor node (100), by sending the F1 setup message to the IAB-donor node (100). The IAB node (200) includes the C-RNTI (i.e. assigned to the UE (240) functionalities in the IAB-node (200), during Phase-1 (IAB-MT (240) setup procedure)) in the F1 setup message to the CU (150) of the IAB-donor node (100).

At 514, as part of the Phase-3 procedure, IAB-DU (250) setup, the context of the IAB node (200) is identified using the C-RNTI at the IAB-donor node (100) and the IAB-donor node (100) may checks whether the stored IAB Authorized information is "authorized" in the IAB node context (i.e. UE context) (i.e. the context of the IAB node (200)).

At 516, as part of the Phase-3 procedure, IAB-DU (250) setup, the IAB-donor node (100) proceed with the setup procedure. To support a flexible plug and play of IAB-node (200) and IAB-donor node (100) without a pre-configuration of the PSK(s), dynamic PSK computation for IKEv2 PSK authentication may also be supported, as specified in TS 33.501 v16.3.0. When dynamic PSK is used, the IAB-node (200) and the IAB-donor node (100) shall calculate the PSK ($K_{IAB}$) as specified in the TS 33.501 v16.3.0. The IAB-donor node (100) uniquely identify the IAB-node's security context ($K_{gNB}$) using the C-RNTI. The IAB-donor node (100) shall use $K_{IAB}$ as PSK for IKEv2 procedure between the IAB-node (200) and the IAB-donor node (100).

Figure 6:
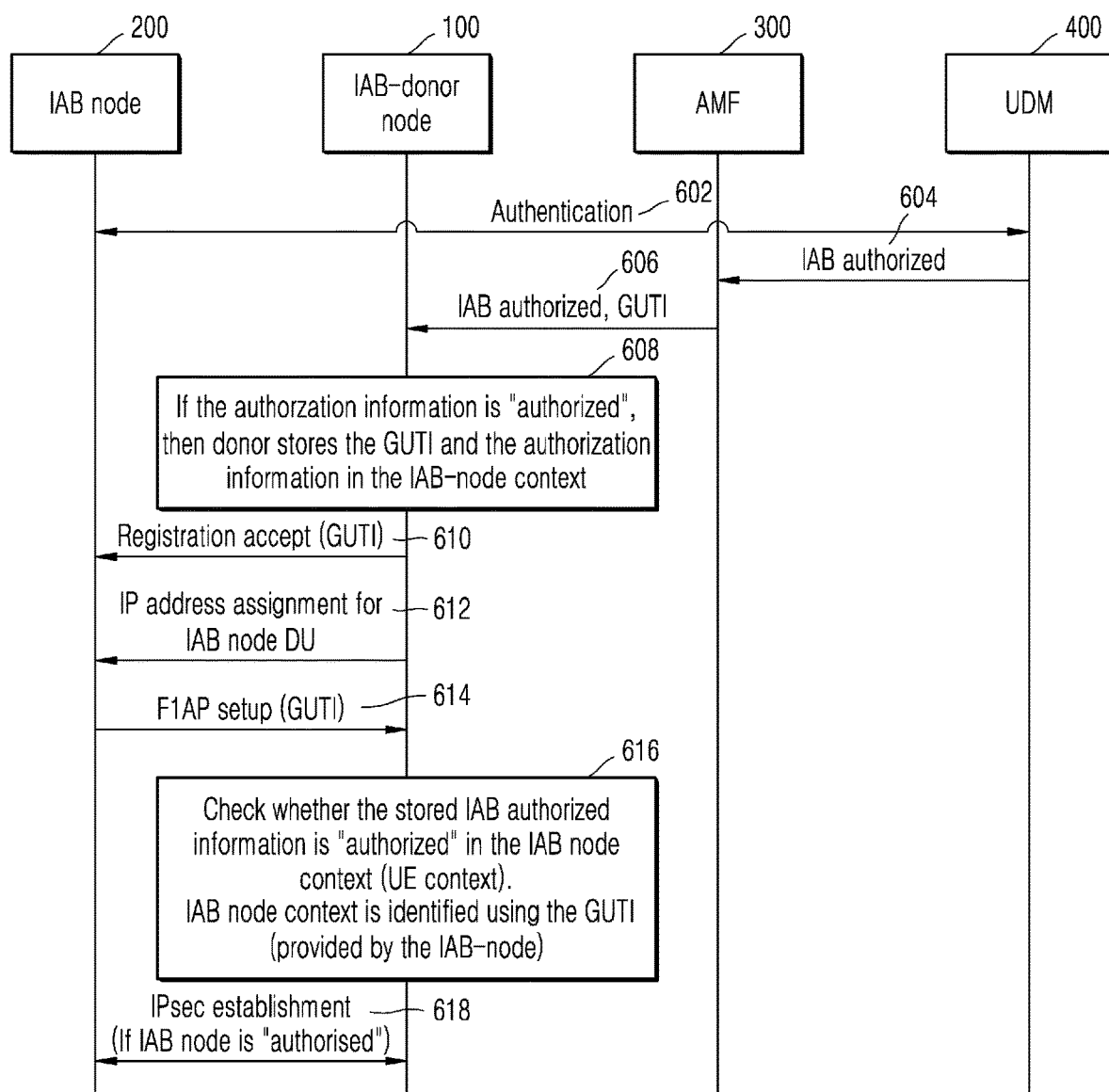
FIG. 6 illustrates a sequence diagram for determining the context of the IAB-node using a GUTI of the IAB node MT functionality to establish/set-up the F1* interface with the IAB-donor node, according to the embodiments as disclosed herein.

FIG. 6 illustrates a sequence diagram for determining the context of the IAB node (200) using the GUTI of the IAB node (i.e. IAB node (200)) MT functionality to establish/set-up the F1* interface with the IAB-donor node (100), according to the embodiments as disclosed herein.

At 602, as part of the IAB-MT (240) setup procedure (Phase-1), the IAB node (200) (i.e. acting as the UE (240) with MT functionalities) performs the authentication and establish the AS security context with the Normal gNB/eNB or with the IAB-donor node (100). If registered with the Normal gNB/eNB, then the IAB node (200) (i.e. acting as the UE (240) with MT functionalities) establishes the AS security context with the IAB-donor node (100), either using the context provided by the Normal gNB/eNB, as part of the handover procedure or by performing Attach/Registration (initial attach) procedure or by SgNB addition procedure (in this case Normal gNB/eNB is MgNB/MeNB).

At 604-606, as part of the IAB-MT (240) setup procedure (Phase-1), the authorization for connectivity of the IAB node (200) to the 5GC/EPS shall be evaluated by the network once the IAB node (200) is successfully identified and authenticated. The authorization is executed during the IAB node registration procedure. The core network shall authorize the IAB node (200) through the subscription profile. The IAB-donor node (100) obtains the IAB authorization information of the IAB node (200) from the AMF (200)/MME (not shown in the FIG. 6) (for example, as part of Initial Context Setup procedure (INITIAL CONTEXT SETUP REQUEST message)). In case of a successful registration procedure, the AMF (300)/MME assigns the GUTI to the IAB-node (200) (i.e. MT functionality).

At 608-610, as part of the IAB-MT (240) setup procedure (Phase-1), the IAB-donor node (100) stores the authorization information of the IAB node (200) (i.e. received at 606) along with the context of the IAB node (200) (i.e. UE context), if the authorization information is indicated as "authorized". Further, in case of the successful registration procedure, the AMF (300)/MME (not shown in the FIG. 6) assigns the GUTI to the IAB-node (200) (i.e. MT functionality) and the IAB-donor node (100) forwards the GUTI to the IAB node (200). The IAB-donor node (100), stores the assigned GUTI in the context of the IAB node (200) (i.e. UE context), when the GUTI is about to send or after sent to the IAB node (200).

At 612, as part of the Phase-2 procedure, assigning the IP addresses to the DU (250) of the IAB node (200) may be sent to the IAB node (200), if requested by the IAB node (200).

At 614, as part of the Phase-3 procedure, IAB-DU (250) setup, the IAB node (200) (i.e. DU functionality of the IAB node (200)) initiates the F1* connection (for example, F1*-C) with the CU (150) of the IAB-donor node (100), by sending the F1 setup message to the IAB-donor node (100). The IAB node (200) includes the GUTI (i.e. assigned to the UE (240) with MT functionalities in the IAB node (200), during Phase-1 (i.e. IAB-MT (240) setup procedure)) in the F1 setup message to the CU (150) of the IAB-donor node (100).

At 616, as part of the Phase-3 procedure, IAB-DU (250) setup, the context of the IAB node (200) is identified using the GUTI at the IAB-donor node (100) and the IAB-donor node (100) may checks whether the stored IAB authorized information is "authorized" in the context of the IAB node (200) (i.e. context).

At 618, as part of the Phase-3 procedure, IAB-DU (250) part setup, the IAB-donor node (100) proceed with the setup procedure. To support a flexible plug and play of IAB-node (200) and IAB-donor node (100) without a pre-configuration of the PSK(s), dynamic PSK computation for IKEv2 PSK authentication may also be supported, as specified in TS 33.501 v16.3.0. When dynamic PSK is used, the IAB-node (200) and the IAB-donor node (100) shall calculate the PSK ($K_{IAB}$) as specified in the TS 33.501 v16.3.0. The IAB-donor node (100) uniquely identify the IAB-node's security context ($K_{gNB}$) using the GUTI. The IAB-donor node (100) shall use $K_{IAB}$ as PSK for IKEv2 procedure between the IAB-node (200) and the IAB-donor node (100).

Figure 7:
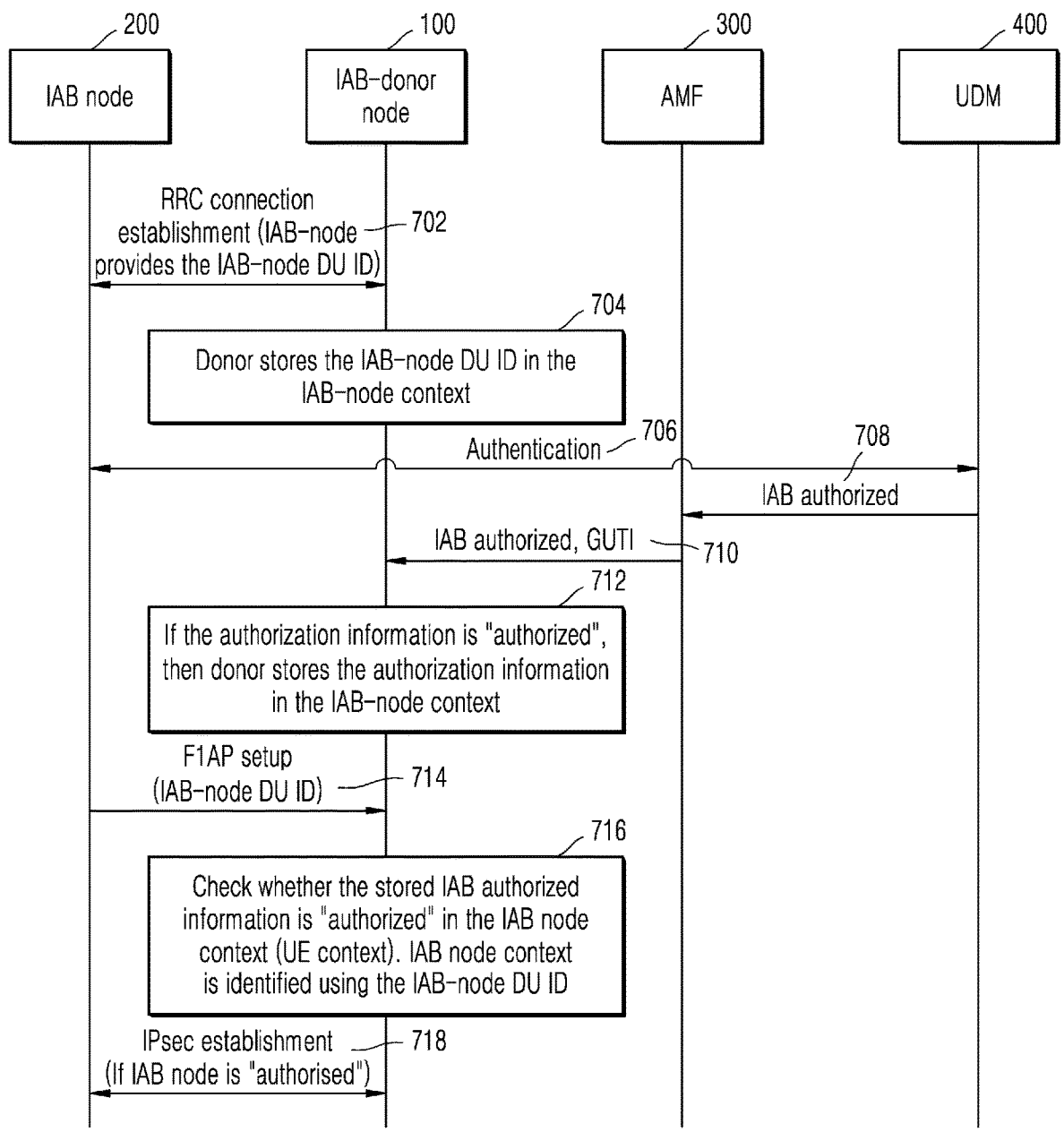
FIG. 7 illustrates a sequence diagram for determining the context of the IAB-node using an IAB node-DU ID to establish/set-up the F1* interface with the IAB-donor node, according to the embodiments as disclosed herein.

FIG. 7 illustrates a sequence diagram for determining the context of the IAB node (200) using the IAB node-DU ID to establish/set-up the F1* interface with the IAB-donor node (100), according to the embodiments as disclosed herein.

At 702-704, as part of the IAB-MT (240) setup procedure (Phase-1), the IAB node (200) (i.e. acting as the UE (240) with MT functionalities) performs RRC Connection establishment procedure. During the RRC connection establishment procedure, the IAB node (200) provides the IAB node-DU ID (i.e. gNB-DU ID of the IAB node) to the IAB-donor node (100) (i.e. IAB-donor-CU (150)). In an embodiment, the IAB node (200) provides the IAB node-DU ID in at least one of RRC messages (e.g. an RRC Setup Complete, an RRC Setup Request, and a new RRC message). The gNB-DU ID/IAB Node-DU ID is configured at the IAB node-DU ID and used to uniquely identify the IAB node-DU ID at least within the CU (150) of the IAB-donor node (100). On reception of the IAB node-DU ID from the IAB node (200), the IAB-donor node (100) stores the IAB node-DU ID of the IAB node (200) along with the context (i.e. UE context) of the IAB node (200).

At 706, as part of the IAB-MT (240) setup procedure (Phase-1), the IAB node (200) (i.e. acting as the UE (240) with MT functionalities) performs the authentication and establish the AS security context with the normal gNB or with the IAB-donor node (100). If registered with the normal gNB/eNB, then the IAB node (200) (i.e. acting as the UE (240) with MT functionalities) establishes the AS security context with the IAB-donor node (100), either using the context provided by the normal gNB/eNB, as part of the handover procedure or by performing attach/registration (i.e. initial attach) procedure or by SgNB addition procedure (Normal gNB/eNB is MgNB/MeNB).

At 708-710, as part of the IAB-MT (240) setup procedure (Phase-1), the authorization for connectivity of the IAB node (200) to the 5GC/EPS shall be evaluated by the network once the IAB node (200) is successfully identified and authenticated. The authorization is executed during the IAB node registration procedure. The core network shall authorize the IAB node (200) through the subscription profile. The IAB-donor node (100) obtains the IAB authorization information of the IAB node (200) from the AMF (300)/MME (not shown in the FIG. 7) (for example, as part of initial context setup procedure (INITIAL CONTEXT SETUP REQUEST message)).

At 712, as part of the IAB-MT (240) setup procedure (Phase-1), the IAB-donor node (100) stores the authorization information of the IAB node (200) (i.e. received in at 710) along with the context of the IAB node (200) (i.e. UE context), if the authorization information is indicated as "authorized". Then as part of the Phase-2 procedure, the Backhaul RLC channel establishment and Routing update procedures are performed.

At 714, as part of the Phase-3 procedure, IAB-DU (250) setup, the IAB node (200) (i.e. DU functionality of the IAB node (200)) initiates the F1* connection (for example, F1*-C) with the CU (150) of the IAB-donor node (100), by sending the F1 setup message to the CU (150) of the IAB-donor node (100). The IAB node (200) includes the IAB node-DU ID in the F1 setup message to the CU (150) of the IAB-donor node (100).

At 716, as part of the Phase-3 procedure, IAB-DU (250) setup, the context of the IAB node (200) is identified using the IAB node-DU ID at the IAB-donor node (100) and the IAB-donor node (100) may checks whether the stored IAB Authorized information is "authorized" in the context of the IAB node (200) (i.e. UE context).

At 718, as part of the Phase-3 procedure, IAB-DU (250) setup, the IAB-donor node (100) proceed with the setup procedure. To support a flexible plug and play of IAB-node (200) and IAB-donor node (100) without a pre-configuration of the PSK(s), dynamic PSK computation for IKEv2 PSK authentication may also be supported, as specified in TS 33.501 v16.3.0. When dynamic PSK is used, the IAB-node (200) and the IAB-donor node (100) shall calculate the PSK ($K_{IAB}$) as specified in the TS 33.501 v16.3.0. The IAB-donor node (100) uniquely identify the IAB-node's security context ($K_{gNB}$) using the IAB node-DU ID. The IAB-donor node (100) shall use $K_{IAB}$ as PSK for IKEv2 procedure between the IAB-node (200) and the IAB-donor node (100).

Figure 8:
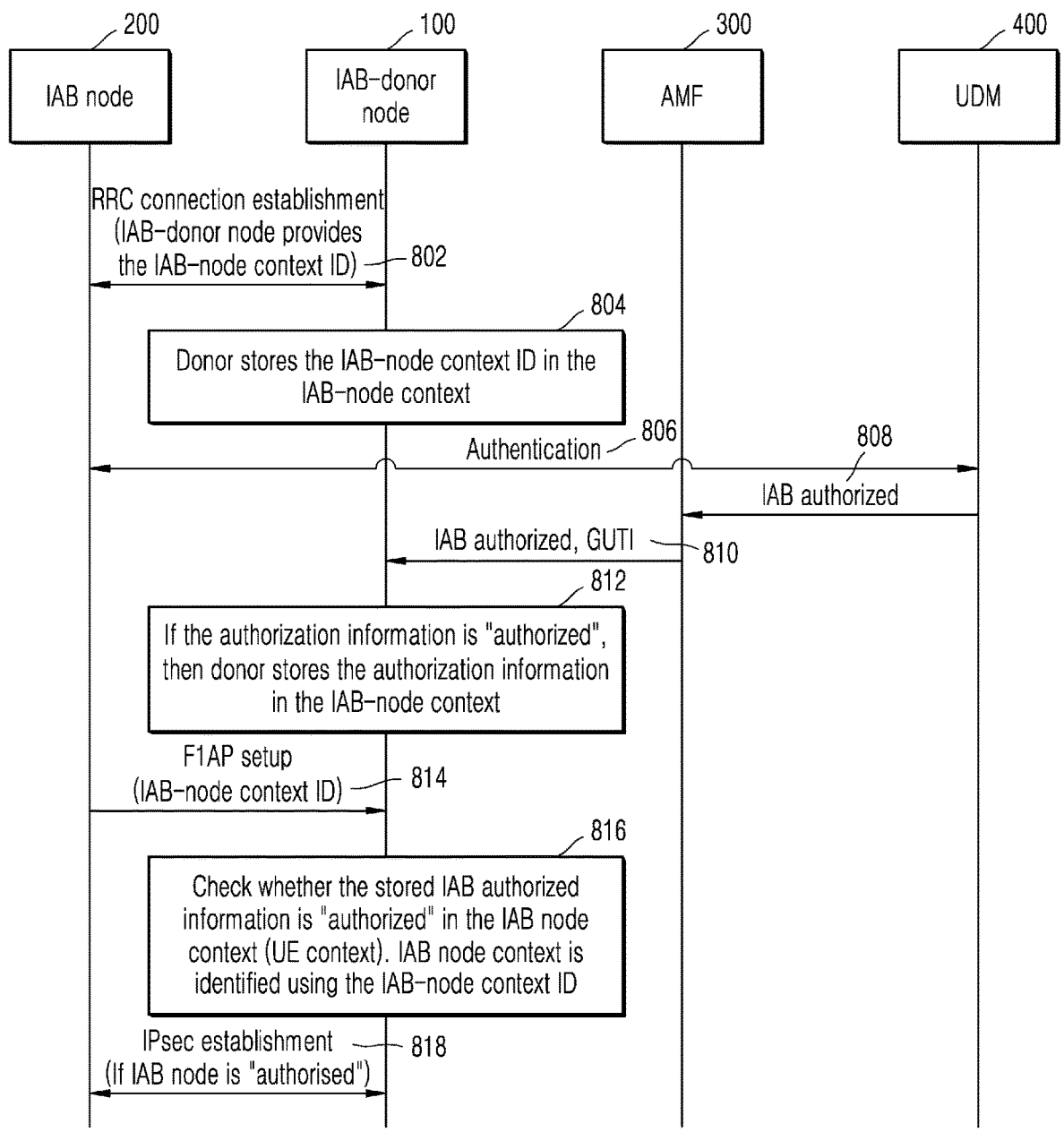
FIG. 8 illustrates a sequence diagram for determining the context of the IAB-node using an IAB node context ID to establish/set-up the F1* interface with the IAB-donor node, according to the embodiments as disclosed herein.

FIG. 8 illustrates a sequence diagram for determining the context of the IAB node (200) using the IAB node context ID to establish/set-up the F1* interface with the IAB-donor node (100), according to the embodiments as disclosed herein.

At 802-804, as part of the IAB-MT (240) setup procedure (Phase 1), the IAB node (200) (i.e. acting as the UE (240) with MT functionalities) performs RRC Connection establishment procedure. During the RRC connection establishment procedure, the IAB node (200) is provided with the IAB node context ID by the IAB-donor node (100) (i.e. IAB-donor-CU (150)). In an embodiment, the IAB-donor node (100) provides the IAB node context ID in at least one of the RRC messages (e.g. an RRC Setup and a new RRC message). The IAB-donor node (100) stores the IAB node-DU ID of the IAB node (200) along with the context of the IAB node (200) (i.e. UE context).

At 806, as part of the IAB-MT (240) setup procedure (Phase-1), the IAB node (200) (i.e. acting as the UE (240) with MT functionalities) performs the authentication and establish the AS security context with the normal gNB or with the IAB-donor node (100). If registered with the normal gNB/eNB, then the IAB node (200) (i.e. acting as the UE (240) with MT functionalities) establishes the AS security context with the IAB-donor node (100), either using the context provided by the Normal gNB/eNB, as part of the handover procedure or by performing attach/registration (initial attach) procedure or by SgNB addition procedure (Normal gNB/eNB is MgNB/MeNB).

At 808-810, as part of the IAB-MT (240) setup procedure (Phase-1), the authorization for connectivity of the IAB node (200) to the 5GC/EPS shall be evaluated by the network once the IAB node (200) is successfully identified and authenticated. The authorization is executed during the IAB node registration procedure. The core network shall authorize the IAB node (200) through the subscription profile. The IAB-donor node (100) obtains the IAB authorization information of the IAB node (200) from the AMF (200)/MME (not shown in the FIG. 8) (for example, as part of initial context setup procedure (i.e. INITIAL CONTEXT SETUP REQUEST message)).

At 812, as part of the IAB-MT (240) setup procedure (Phase-1), the IAB-donor node (100) stores the authorization information of the IAB node (200) (i.e. received at 810) along with the context of the IAB node (200) (i.e. UE context), if the authorization information is indicated as "authorized". Then as part of the Phase-2 procedure, the Backhaul RLC channel establishment and Routing update procedures are performed.

At 814, as part of the Phase-3 procedure, IAB-DU (250) setup, the IAB node (200) (i.e. DU functionality of the IAB node (200)) initiates the F1* connection (for example, F1*-C) with the CU (150) of the IAB-donor node (100), by sending F1 setup message to the CU (150) of the IAB-donor node (100). The IAB node (200) includes the IAB node context ID in the F1 setup message to the CU (150) of the IAB-donor node (100).

In an embodiment, the I-RNTI assigned by the IAB-donor node (100) (when the IAB node (200) transit to RRC_INACTIVE, the gNB shall assign a fresh I-RNTI) in the RRCRelease with suspendConfig message. As part of the Phase-3 procedure (i.e. IAB-DU (250) part setup), the IAB node (200) (i.e. DU functionality of the IAB node (200)) initiates the F1* connection (for example, F1*-C) with the CU (150) of the IAB-donor node (100), by sending the F1 setup message to the CU (150) of the IAB-donor node (100). The IAB node (200) includes the I-RNTI in the F1 setup message to the CU (150) of the IAB-donor node (100).

At 816, as part of the Phase-3 procedure, IAB-DU (250) setup, the IAB node context is identified using the IAB node context ID or the I-RNTI at the IAB-donor node (100) and the IAB-donor node (100) checks whether the stored IAB authorized information is "authorized" in the IAB node context (i.e. UE context).

At 818, as part of the Phase-3 procedure, IAB-DU (250) setup, the IAB-donor node (100) proceed with the setup procedure. To support a flexible plug and play of IAB-node (200) and IAB-donor node (100) without a pre-configuration of the PSK(s), dynamic PSK computation for IKEv2 PSK authentication may also be supported, as specified in TS 33.501 v16.3.0. When dynamic PSK is used, the IAB-node (200) and the IAB-donor node (100) shall calculate the PSK ($K_{IAB}$) as specified in the TS 33.501 v16.3.0. The IAB-donor node (100) uniquely identify the IAB-node's security context ($K_{gNB}$) using the IAB-node context ID or the I-RNTI. The IAB-donor node (100) shall use $K_{IAB}$ as PSK for IKEv2 procedure between the IAB-node (200) and the IAB-donor node (100).

In an embodiment, RRC (MT functionality) and F1 (DU functionality) may have an internal/proprietary interface depending on deployment scenarios. The MT and DU in IAB node (200) are logically separated and can be physically either. Also in the IAB-donor-CU (150) (i.e. the CU of the IAB-donor node (100)), RRC covering MT and F1 covering DU may be logically separated and can be physically either. In this case, the MT functionality (RRC) provides the necessary parameters (for example, PSK, authorization information, like so) to the DU functionality by using internal/proprietary interface or through a standardized interface. Alternatively, DU/F1 sends a request to MT/RRC including the necessary information (e.g. C-RNTI or IP address of the IAB-node DU (F1-C)) to the MT functionality (RRC) to obtain the necessary parameters (for example, PSK, authorization information, like so), if it is not available with the DU/F1 functionality in the IAB node (200).

In an embodiment, the IP addresses and/or Fully Qualified Domain Names (FQDN) is used for identification of the DU functionality and the mapping between the identity of the MT functionality (for example, C-RNTI/IAB Node ID) and the identity of DU functionality (for example, IAB Node ID/IP Address) is maintained in the IAB-donor node (100) for the IAB nodes (e.g. IAB node (200)), so that the IAB-donor node (100) can retrieve the corresponding UE context (i.e. authorization information in the UE context).

In an embodiment, for the DU functionality (F1) to get authorized during the IAB-DU (250) setup, the MT provides the necessary information (e.g. PSK, authorization information, like so), if it is not available with the DU, for the DU functionality in the IAB node (200). The necessary information is provided by using internal/proprietary interface or through a standardized interface.

In an embodiment, the unique identity/parameter allocated to the IAB node (200) during the IAB-MT (240) setup and/or Backhaul RLC channel establishment and/or Routing update phase is stored in the UE context, which is used to identify the context for authorization check during IAB-DU (250) part setup, is selected, based on the RRC State of the IAB Node's MT functionality. For illustrative purpose, if the RRC State of the IAB Node's (200) MT functionality is RRC_INACTIVE, then the I-RNTI and/or IAB Node's (200) DU IP address is used, if the RRC State of the IAB Node's (200) MT functionality is RRC_Connected, then GUTI and/or IAB Node's (200) DU IP address is used.

In an embodiment, during the Phase-3 (IAB DU part setup) procedure, if the IAB node (200) (i.e. acting as the UE (240) with MT functionalities) is in RRC Idle state, then the IAB node (200) transit to RRC_Connected (by itself or triggered by the IAB-donor node) and then the Phase-3 (IAB DU part setup) procedure is performed, so that authorization check for the IAB node (200) is performed by the IAB-donor node (100).

In an embodiment, during the Phase-3 (IAB DU part setup) procedure, the authorization check is performed by the IAB-donor node (100) by retrieving the UE context using the identity provided as part of the F1 setup request messages before performing the authentication procedure to establish the F1 interface. In an embodiment, some deployments use the BAP address of the IAB-node (F1-C) for identification of the AS security context instead of IAB-DU IP address.

In an embodiment, during the Phase-3 (IAB DU part setup) procedure, the IAB-node (200) includes the IP address of the its DU F1-C usage IP address as the IKEv2 Identification-Initiator (IDi) payload value and the IAB-donor node (100) uniquely identify the IAB-node's security context ($K_{gNB}$) using the IKEv2 Identification-Initiator (IDi) payload value. The IAB-donor node (100) shall use $K_1$ as PSK for IKEv2 procedure between the IAB-node (200) and the IAB-donor node (100).

The embodiments disclosed herein can be implemented using at least one software program running on at least one hardware device and performing network management functions to control the elements.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for authentication of an Integrated Access and Backhaul (IAB) node in a wireless network performed by an IAB-donor node, the method comprising:
   obtaining an IAB authorization information of the IAB node from a network entity during an initial context setup procedure;
   sending, to the IAB node, an Internet Protocol (IP) address of a distributed unit (DU) of the IAB node to identify a security context information of the IAB node in response to a request for the IP address from the IAB node;
   identifying the security context information of the IAB node based on the IP address of the DU of the IAB node;
   generating a security parameter, based on the security context information of the IAB node; and
   establishing an Internet Protocol Security (IPsec) connection with the IAB node, based on the generated security parameter.

2. The method as claimed in claim 1, wherein the IAB authorization information of IAB node is obtained based on a subscription profile of the IAB node from a core network.

3. The method as claimed in claim 1, wherein the identifying the security context information of the IAB node comprises:
   identifying the security context information of IAB node by using at least one of:
   a Cell Radio Network Temporary Identifier (C-RNTI);
   a Globally Unique Temporary ID (GUTI) of the IAB node;
   an IAB node DU ID, and
   an IAB node context ID.

4. The method as claimed in claim 1, wherein the security context information of the IAB node comprises an Access Stratum (AS) context with the IAB-donor node.

5. The method as claimed in claim 1, wherein the IP address of the DU of the IAB node is allocated by at least one of an operations, administration and management (OAM) server, a central unit (CU) of the IAB-donor node, and a DU of the IAB-donor node.

6. An Integrated Access and Backhaul (IAB) donor node for authentication of an IAB node in a wireless network, the IAB donor node comprising:
   a memory;
   a processor coupled with the memory; and
   an authentication controller, coupled with the processor, configured to:
   obtain an IAB authorization information of the IAB node from one of a network entity during an initial context setup procedure;
   send, to the IAB node, an Internet Protocol (IP) address of a distributed unit (DU) of the IAB node to identify a security context information of the IAB node in response to determining that the IAB node is authorized;

identify the security context information of the IAB node based on the IP address the DU of the IAB node;

generate a security parameter, based on the security context information of the IAB node; and establish an Internet Protocol Security (IPsec) connection with the IAB node, based on the generated security parameter.

7. The IAB-donor node as claimed in claim 6, wherein the IAB authorization information of IAB node is obtained based on a subscription profile of the IAB node from a core network.

8. The IAB-donor node as claimed in claim 6, wherein the security context information of the IAB node is identified by using at least one of:

a Cell Radio Network Temporary Identifier (C-RNTI);

a Globally Unique Temporary ID (GUTI) of the IAB node;

an IAB node DU ID; and an IAB node context ID.

9. The IAB-donor node as claimed in claim 6, wherein the security context information of the IAB node comprises an Access Stratum (AS) context with the IAB-donor node.

10. The IAB-donor node as claimed in claim 6, wherein the IP address of the DU of the IAB node is allocated by at least one of an operations, administration and management (OAM) server, a central unit (CU) of the IAB-donor node, and a DU of the IAB-donor node.

11. A method for authentication of an Integrated Access Backhaul (IAB) node performed by the IAB node, the method comprising:

performing an IAB-Mobile Termination (MT) setup procedure;

requesting an Internet Protocol (IP) address of a Distributed Unit (DU) of the IAB node used to identify a security context information of the IAB node to an IAB-donor node, after proceeding the IAB-MT setup procedure;

receiving the IP address of the DU of the IAB node from the IAB-donor node;

transmitting a F1 setup message to the IAB-donor node; and establishing an Internet Protocol Security (IPsec) connection with the IAB-donor node, based on a security parameter generated by the IAB-donor node.

12. The method as claimed in claim 11, wherein the IAB-MT setup procedure comprises at least one of:

performing Radio Resource Control (RRC) connection establishment with the IAB-donor node;

performing authentication with a core network; and performing establishment an Access Stratum (AS) context with the IAB-donor node.

13. The method as claimed in claim 11, wherein the F1 setup message comprises an IAB node DU ID.

14. The method as claimed in claim 11, wherein the security parameter is generated based on the security context information which is identified by using the IP address of the DU of the IAB node.

\* \* \* \* \*